United States Patent
Kronberger et al.

(10) Patent No.: US 7,502,598 B2
(45) Date of Patent: Mar. 10, 2009

(54) TRANSMITTING ARRANGEMENT, RECEIVING ARRANGEMENT, TRANSCEIVER AND METHOD FOR OPERATION OF A TRANSMITTING ARRANGEMENT

(75) Inventors: Rainer Kronberger, Würselen (DE); Dirk Heberling, Rheinberg (DE); Matthias Geissler, Rheurdt (DE); Jan-Erik Müller, Ottobrunn (DE)

(73) Assignee: Infineon Technologies AG, Munich (DE)

( * ) Notice: Subject to any disclaimer, the term of this patent is extended or adjusted under 35 U.S.C. 154(b) by 511 days.

(21) Appl. No.: 11/139,351

(22) Filed: May 27, 2005

(65) Prior Publication Data

US 2005/0277399 A1    Dec. 15, 2005

(30) Foreign Application Priority Data

May 28, 2004   (DE) ...................... 10 2004 026 133

(51) Int. Cl.
H04B 1/04 (2006.01)
(52) U.S. Cl. ................. 455/123; 455/193.2; 455/197.3; 455/260; 333/17.3
(58) Field of Classification Search ............... 455/91, 455/107, 116–121, 123, 124, 125, 129, 193.1, 455/193.2, 196.1, 197.1–197.3, 256–260, 455/339, 341; 333/17.1, 17.3
See application file for complete search history.

(56) References Cited

U.S. PATENT DOCUMENTS

| | | | |
|---|---|---|---|
| 5,564,086 A * | 10/1996 | Cygan et al. ................. | 455/126 |
| 5,862,458 A * | 1/1999 | Ishii ............................ | 455/107 |
| 6,140,966 A | 10/2000 | Pankinaho | |
| 6,219,532 B1 | 4/2001 | Tanaka et al. | |
| 6,259,550 B1 | 7/2001 | Gottfried-Gottfried et al. | |
| 6,650,295 B2 | 11/2003 | Ollikainen et al. | |
| 7,372,346 B2 * | 5/2008 | Tilmans et al. ............... | 333/187 |
| 2004/0075504 A1 * | 4/2004 | Vintola ........................ | 330/298 |
| 2005/0059362 A1 * | 3/2005 | Kalajo et al. .............. | 455/127.1 |
| 2006/0025088 A1 * | 2/2006 | Pietig et al. .................. | 455/121 |

FOREIGN PATENT DOCUMENTS

| | | |
|---|---|---|
| DE | 102 23 446 A1 | 12/2003 |
| DE | 699 10 0349 T2 | 2/2004 |
| DE | 69910039 T2 | 2/2004 |
| DE | 601 00 421 T2 | 4/2004 |
| JP | 63248225 | 10/1988 |
| JP | 10209897 | 8/1998 |
| JP | 2001267950 | 9/2001 |
| JP | 2002232313 | 8/2002 |
| JP | 2003119836 | 4/2003 |
| JP | 2003258029 | 9/2003 |
| JP | 2003332934 | 11/2003 |
| JP | 2004088508 | 3/2004 |

* cited by examiner

Primary Examiner—Nhan T Le
(74) Attorney, Agent, or Firm—Eschweiler & Associates, LLC (57) ABSTRACT

In a transmitting arrangement a power amplifier is coupled to a radio-frequency antenna arrangement via a controllable matching apparatus. This allows direct impedance transformation of the output of the power amplifier to the input of the radio-frequency antenna arrangement. There is no need for transformation to the 50 ohm standard. The power amplifier, matching apparatus and a control circuit for controlling the impedance of the matching apparatus form a functional unit, which is advantageously in the form of a monolithically integrated structure in a semiconductor body. A receiving arrangement is produced in the same way, comprising an antenna, a filter device and a matching apparatus connected between them.

15 Claims, 4 Drawing Sheets

TRANSMITTING ARRANGEMENT, RECEIVING ARRANGEMENT, TRANSCEIVER AND METHOD FOR OPERATION OF A TRANSMITTING ARRANGEMENT

REFERENCE TO RELATED APPLICATIONS

This application claims the benefit of the priority date of German application DE 10 2004 026 133.4, filed on May 28, 2004, the contents of which are herein incorporated by reference in their entirety.

FIELD OF THE INVENTION

The invention relates to a transmitting arrangement, a receiving arrangement, and a transceiver having such a transmitting arrangement and receiving arrangement. The invention also relates to a method for operation of a transmitting arrangement.

BACKGROUND OF THE INVENTION

Modern cellular telephones require ever higher data transmission rates and different mobile radio standards. While the GSM mobile radio standard already provides adequate data transmission rates for speech data transmission, the WCDMA/UMTS mobile radio standard is required for transmission of greater amounts of data. The W-LAN (Wireless Local Area Network) is used for very high data transmission rates, for example, for multimedia applications. Owing to the narrow available frequency spectrum, different transmission frequencies in the range from 800 MHz to 2.5 GHz are provided for the various mobile radio standards. The different requirements for the transmission and receiver stages in mobile communication appliances necessitate the development of radio-frequency assemblies of high functionality.

Examples of various assemblies or modules that are used in the transmission and reception paths of a communication appliance or cellular telephone, or cellphone for short, include not only the power amplifier for amplification of a signal to be transmitted as well as an antenna, but also an antenna switch, which connects antennas with different resonant frequencies to the power amplifier. Each antenna that is used within the cellphone is provided with its own matching to the power amplifier in the transmission path.

The same applies to the receiving amplifier, which is likewise coupled to the various antennas. The various assemblies or modules in the transmission path and in the reception path of a mobile communication appliance are in general each developed, designed and implemented in their own right. They are accommodated on different substrate mounts and are each provided with a standardized 50 ohm interface.

Figure 8:
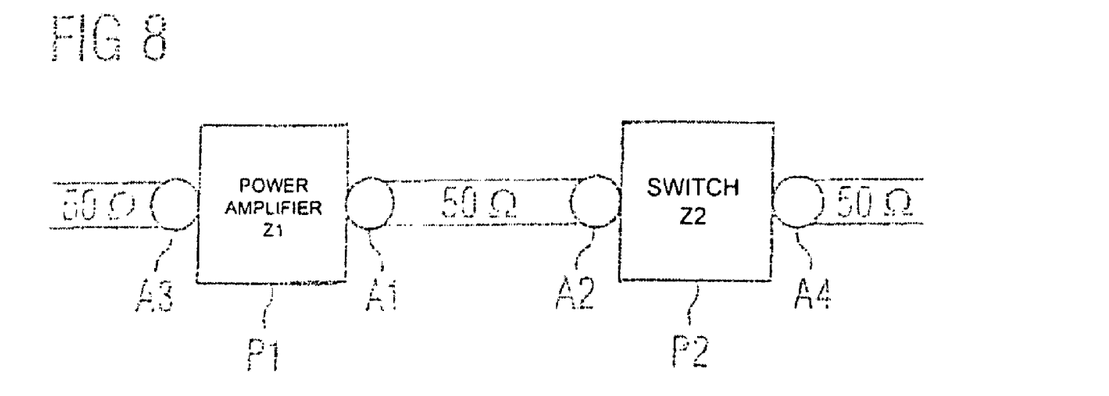
FIG. 8 is a block diagram illustrating a detail of a prior art transmitting arrangement.

FIG. 8 shows a detail of a transmission path in a conventional communication appliance. In this case, a power amplifier P1 is connected to an antenna switch P2. One output of the antenna switch P2 in turn leads to an antenna, which is not shown here. The power amplifier P1 and the switch P2, which are formed in different semiconductor bodies, have the respective impedance Z1 and Z2. The two impedances Z1 and Z2 of the circuits differ from one another and correspond to the impedances of the circuits which process the signals. In order to minimize the signal losses resulting from reflections, the circuit A1 transforms the impedance to 50 ohms, upstream of the output of the power amplifier P1. The output of the power amplifier is then 50 ohms.

In the same way, a matching apparatus A2 is connected upstream of the internal signal processing for the antenna circuit P2, and transforms the line impedance from 50 ohms on the line L to the internal impedance Z2 of the antenna circuit P2. The power amplifier P1 and the antenna circuit P2 can thus be connected to one another, despite having different internal circuit impedances Z1 and Z2. The transformation circuits A1 and A2 are in this case generally accommodated within the corresponding semiconductor body of the power amplifier P1 and of the antenna circuit P2, respectively. Any mismatching of the line L, which would lead to greater reflection losses, is thus reduced.

The provision of the standardized 50 ohm interfaces allows widely differing assemblies or modules to be connected such that they are matched to one another at radio frequencies.

However, matching of the internal impedance Z1 to the input impedance of 50 ohms and, respectively, the output impedance, by the transformation circuit A3 and A1, respectively, is possible only within a relatively narrow frequency range. This is due to the internal matching circuits A3 and A1, respectively, which allow matching of the respective impedances Z2 and Z1 only in a narrow frequency range. Outside these frequency ranges, matching errors result in losses, which considerably reduce the performance of the corresponding component. Any change in the internal impedance Z1 likewise leads to a mismatch and to a discrepancy from the standardized 50 ohms, since the transformation circuits A1 and A3 now carry out fixed impedance matching. This effect is particularly evident in the case of antennas that are especially sensitive to environmental influences. When designing a transmitting arrangement, an appropriate margin must therefore be planned in, in order to make it possible to satisfy the entire specification. This increases the overall power consumption of the entire circuit, reduces the efficiency, and increases the production costs. Furthermore, a number of space-saving antennas must be matched to the geometry of the housing.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a receiving arrangement and a transceiver arrangement which are insensitive to external environmental influences. The invention also includes a method for operation of a transmitting arrangement which is particularly insensitive to external interference.

One aspect of the invention is to reduce the number of standardized 50 ohm interfaces within the various assemblies of the transmitting and receiving arrangement. This is achieved by means of a functional unit comprising radio-frequency antennas and power amplifiers in a transmission path. This contains integrated control for the input impedance of the radio-frequency antenna arrangement. The transmitting arrangement is in this case designed such that an internal output impedance of the power amplifier is directly matched to an input impedance of the radio-frequency antenna arrangement. The circuit impedances of the power amplifier are thus directly matched to the input impedances of the antenna apparatus without having to carry out any transformation to more than 50 ohms by means of additional transformation circuits. This matching is carried out by means of a controllable matching apparatus, which is connected between the output of the power amplifier and the at least one connection of the radio-frequency antenna arrangement.

A controllable matching apparatus is provided in the same way in a receiving arrangement, and is connected between the input of a filter device and the at least one connection of the radio-frequency arrangement. The matching apparatus is in this case designed for controllable matching of an output impedance of the at least one connection of the radio-frequency antenna arrangement to an input impedance of the input of the filter device. The matching is in this case carried out in the transmitting arrangement and in the receiving arrangement by means of a control device with an output for a matching signal. The output of the control device is connected to the matching apparatus. The control device is designed to produce and to emit the matching signal as a function of at least one predetermined parameter.

Furthermore, the transmitting arrangement and the receiving arrangement contain a matching circuit for frequency matching of the radio-frequency antenna arrangement. The matching circuit in this case has at least one tuning element which can be coupled to the tuning connection of the radio-frequency antenna arrangement. The at least one tuning element is coupled to the tuning connection of the radio-frequency antenna arrangement as a function of a tuning signal at a control input. Depending on the position of the tuning element, the radio-frequency antenna arrangement is thus switched between one of two resonant frequencies. The tuning circuit thus makes it possible to change a resonant frequency of the radio-frequency antenna arrangement in the transmitting arrangement and in the receiving arrangement. The bandwidth of the radio-frequency antenna arrangement that is used in the transmitting arrangement and in the receiving arrangement is thus considerably widened. The impedance change which results from this in the event of a change in the resonant frequency of the radio-frequency antenna arrangement can be compensated for by means of a controllable matching apparatus, thus reducing any mismatch. A single very broadband antenna can thus preferably be used for a number of different mobile radio standards. Controlling the matching of the power amplifier to the radio-frequency antenna arrangement in the transmitting arrangement and of the radio-frequency antenna arrangement to the input of the filter device in the receiving arrangement during operation means that there is no longer any need for transformation to a standardized interface. This also avoids additional power losses caused by the transformation process. Furthermore, costs and space can be saved, resulting from propagation by means of a single broadband multifunctional antenna.

In one example, at least the matching apparatus and the power amplifier are in the form of an integrated circuit in one semiconductor body. They thus form a functional unit.

In one embodiment of the transmitting arrangement, the arrangement has a measurement apparatus for detection of any mismatch between the matching apparatus and the output of the power amplifier. The measurement apparatus is in this case designed to emit a parameter that is derived from this mismatch to an input of the control device. The control device produces the matching signal for the matching apparatus as a function of the applied parameter, in order to compensate for the mismatch. This makes it possible to compensate for dynamic changes in the matching, which are caused, for example, by external environmental influences on the radio-frequency antenna arrangement. In particular, the transmitting arrangement according to the invention is independent of the antenna that is used and of the type of casing containing the transmitting arrangement.

In one example the measurement apparatus is configured to measure any reflected power. Alternatively, the measurement apparatus is designed as a standing wave detector for measurement of a standing wave ratio between the output of the power amplifier and the input of the matching apparatus. Both measurements allow conclusions to be drawn about any change in the impedance of the antenna that is connected to the matching arrangement, or about the output impedance of the power amplifier.

In one embodiment, the transmitting arrangement and the receiving arrangement are part of a transceiver arrangement. The radio-frequency antenna arrangement and the tuning circuit that is coupled thereto are designed such that they can be used jointly both by the transmitting arrangement and by the receiving arrangement. The matching apparatuses for the transmission path and the reception path thus means that the broadband antenna is designed both as a transmitting antenna and as a receiving antenna. Different impedances in the input of a filter device in the reception path and in the output of the power amplifier of the transmission path are transformed by the respective matching apparatus to the impedance of the antenna arrangement.

In addition to the provision of an amplifier for the signal to be transmitted and the provision of a radio-frequency antenna arrangement for transmission of a signal, a method for operation of a transmitting arrangement includes coupling of an output of the amplifier to the input of the radio-frequency antenna arrangement. This coupling process is carried out by directly matching an output impedance of the amplifier to an input impedance of the radio-frequency antenna arrangement. Consequently, there is no need for transformation to a standardized interface, preferably the 50 ohm interface. Furthermore, the method includes the determination of any impedance change between the output of the power amplifier and the input of the radio-frequency antenna arrangement. Any impedance change is corrected by changing the input impedance of the radio-frequency antenna arrangement. In one example, this is accomplished by means of a controllable matching apparatus, which is connected upstream of the input of the antenna arrangement. The matching apparatus corrects the impedance of the radio-frequency antenna arrangement as a function of the determined impedance change.

The method makes it possible to form a functional unit of a transmitting arrangement whose individual component impedances are optimally matched to one another. Impedance changes are corrected. The functional unit is particularly flexible and is independent of external influences changing the impedances. The standardized transformation process to a fixed value that has been carried out until now can thus be omitted. Furthermore, if the method according to the invention is carried out continuously, the power consumption and the efficiency of the power amplifier are independent of the external influences which change the antenna impedance. This makes it possible to produce very broadband antennas in the arrangement.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in detail in the following text with the assistance of drawings, in which.

DETAILED DESCRIPTION OF THE INVENTION

Figure 1:
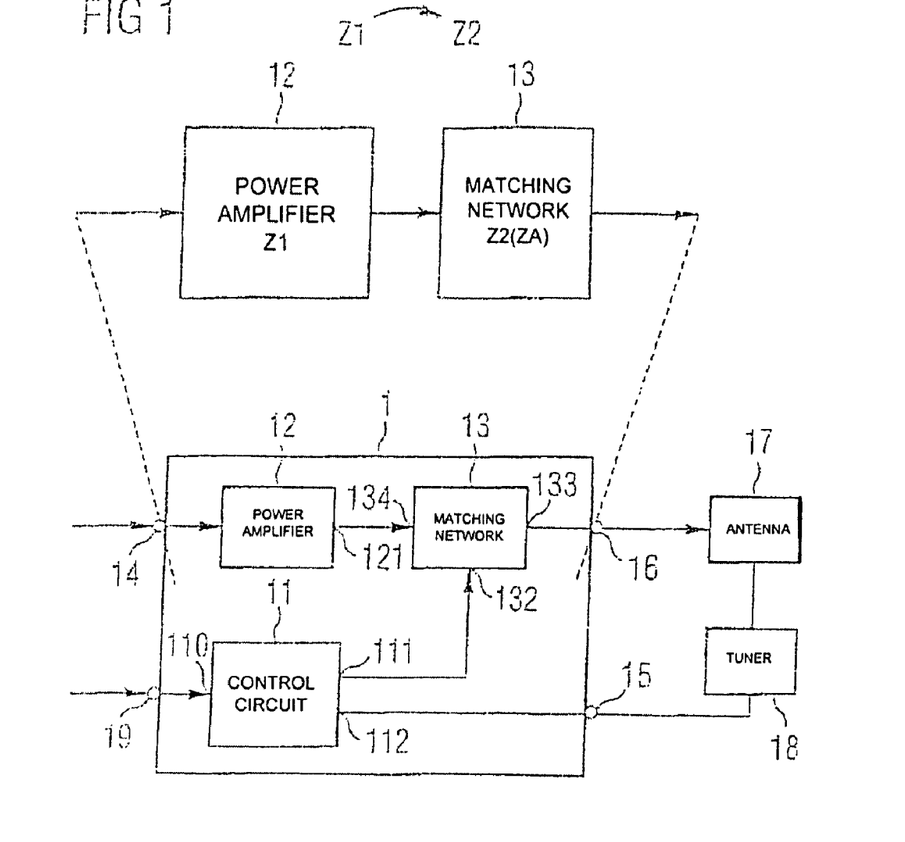
FIG. 1 is a block diagram illustrating an exemplary embodiment of the transmitting arrangement according to the invention.

FIG. 1 shows an exemplary embodiment of a transmitting arrangement according to the invention. This transmitting arrangement can be implemented in particular in mobile communication appliances which are designed for transmission of signals on the basis of different mobile radio standards. The transmitting arrangement according to the invention is integrated in a mobile communication appliance which is designed to transmit signals on the basis of the GSM Standard or on the basis of the WCDMA Standard. Both mobile radio standards transmit and receive on different frequencies. GSM transmits in the range between 800 MHz and 1.9 GHz, with signals based on the WCDMA Standard being transmitted and received in the region of 2.1 GHz. The bandwidth or frequence range of the signals to be transmitted may thus cover several 100 MHz. In consequence, it is necessary to provide a very broadband antenna for the transmitting arrangement according to the invention.

As can be seen in the exemplary embodiment in FIG. 1, an antenna 17 is connected to a tuning apparatus 18 for this purpose. The radio-frequency antenna 17 is tuned by means of a number of tuning elements (which are not illustrated here for reasons of clarity) within the tuning device 18. These tuning elements can be connected to the antenna apparatus as a function of a control signal at the input of the tuning device 18, thus changing its resonant frequency. This makes it possible to achieve an optimum emission or radiation behavior over a wide frequency range. However, the input impedance of the antenna also changes with any change in the resonant frequency.

For compensation purposes, the transmitting device according to the invention contains a matching network 13, whose output 133 is in turn connected to the antenna device 17. Furthermore, the matching apparatus 13 contains a control input 132 for adjusting an impedance of the input 134 of the matching apparatus 13. In addition, the transmitting arrangement has a power amplifier 12, whose output 121 is connected to the matching network 13.

The control input 132 of the matching apparatus 13 is connected to an output 111 of a control circuit 11. The control circuit 11 has an input 110 and a second output 112, which is coupled to the tuning apparatus 18.

At its input 110, the control device 11 receives a parameter which defines the output frequency of the signal to be transmitted. The control device 11 uses this to produce a tuning signal at its output 112, and this tuning signal is supplied to the tuning apparatus 18. The tuning apparatus 18 connects one or more of its resonant elements to the antenna apparatus 17, as a function of this tuning signal. The signal at the input 110 of the control circuit 11 results in the resonant frequency of the radio-frequency antenna 17 being set so as to achieve an optimum emission characteristic for the signal to be transmitted. For example, the resonant frequency of the antenna is set to 850 MHz for transmission of a GSM signal, and is set to 2.1 GHz for a signal based on the WCDMA Standard. The resonant elements in the tuning apparatus 18 are chosen so as to achieve an optimum emission or radiation characteristic over the entire frequency range that is covered by the antenna.

The change in the resonant frequency also, however, results in a change in the input impedance of the radio-frequency antenna arrangement 17, because this now results in a change in the internal resistance. Normally, this leads to the output impedance of the amplifier 12 at the output 121 and the input impedance of the antenna arrangement 17 being of different magnitude. This results in increased reflection in the transmission path and in a portion of the emitted power being reflected back into the amplifier device 12. In order to prevent this, the control circuit 11 at the same time produces a control signal at the output 111, which controls the matching apparatus 13 so as to compensate for the impedance change of the radio-frequency antenna. The input of the matching apparatus and thus the radio-frequency antenna arrangement are thus once again optimally matched to the output of the amplifier 12.

This process is illustrated once again in detail in the upper part of the figure element 1. The output impedance of the internal circuits of the power amplifier is Z1. The input impedance of the matching apparatus 13 is Z2, and is also dependent on the impedance ZA of the radio-frequency device 17. The matching apparatus 13 always transforms its input impedance Z2 to the output impedance Z1 of the amplifier 12, thus always ensuring optimum matching. If the output impedance Z1 of the amplifier 12 or the impedance ZA of the radio-frequency antenna arrangement now changes as a result of external influences, then the resultant mismatch is compensated for again by a change in Z2 by the matching apparatus 13.

The functional unit formed by the power amplifier 12, the matching apparatus 13 and the control unit 11 makes it possible to achieve optimum matching to a radio-frequency antenna over a very broadband frequency range. In particular, this means that there is no need for impedance transformations of the output impedance of the power amplifier to 50 ohms, or from 50 ohms to an input impedance of the antenna arrangement. In this exemplary embodiment, the power amplifier 12, the matching apparatus 13 and the control circuit 11 are in the form of a monolithically integrated structure in a single semiconductor body 1. In this case, all of the necessary parameters for adjustment of the matching apparatus 13 and of the tuning apparatus 18 are passed to the control circuit 11, in the form of a digital signal, at the input 19 of the semiconductor body 1. This includes, for example, resonant frequencies of the antenna, and/or the maximum output power or else the bandwidth of the signal. A standardized 50 ohm interface is provided only at the input 14. However, this can likewise be dispensed with, with appropriate design and matching. The signal input of the radio-frequency antenna arrangement 17 can be connected directly to the input 16 of the semiconductor body 1. There is no need for transformation to the standardized 50 ohms or to any other desired value, since impedance matching to the output impedance of the power amplifier 12 is carried out automatically by the matching apparatus 13.

External influences which change the impedance of the antenna are, for example, the geometry of a casing in which the transmitting arrangement according to the invention is used. Relatively large metallic objects such as a car roof in the vicinity of the antenna can also change its input impedance. This results in both steady-state and dynamic resultant mismatches, some of which vary. The partial output power reflection which is associated with this is compensated for and reduced by the matching apparatus 13.

Figure 2:
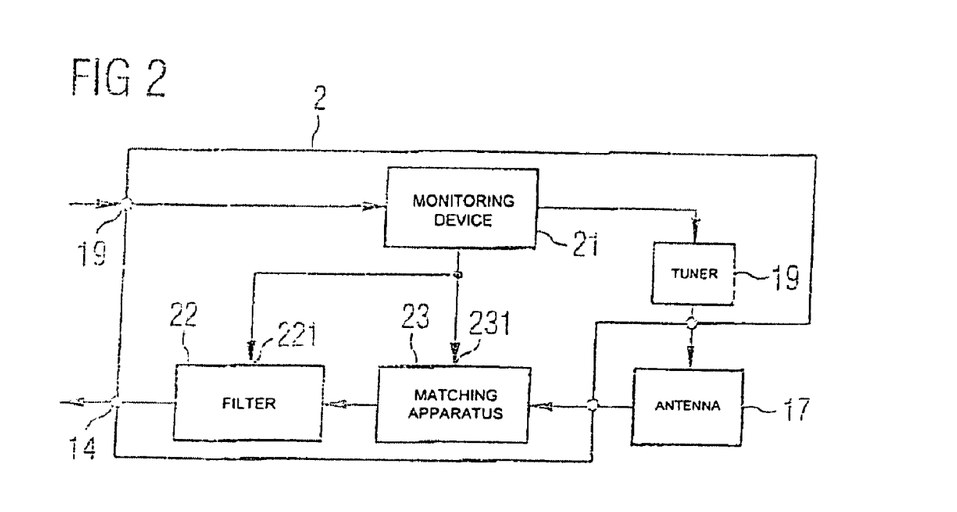
FIG. 2 is a block diagram illustrating an exemplary embodiment of the receiving arrangement according to the invention.

FIG. 2 shows one embodiment of a receiver path according to the invention. Identical components in this case have the same reference symbols. In this embodiment, the monitoring device 21, the tuning circuit 18 for frequency tuning of the radio-frequency antenna arrangement 17, the matching apparatus 23 and the filter 22 are in the form of a monolithically integrated structure in a single semiconductor body 2. Parameters for adjustment of an impedance and of the resonant frequency of the radio-frequency antenna arrangement 17 are passed to the control circuit 21 at the input 19 of the semiconductor body 2. This control circuit 21 uses these parameters to produce the control signals for the tuning circuit 18 for frequency tuning. The impedance change that results from this is signaled by means of control signals to a control input 231 of the matching apparatus 23, which then matches the output impedance of the radio-frequency antenna arrangement to the input impedance of the filter device 22.

The filter device 22 contains a control input 221, and is equipped with a filter whose cut-off frequency is tunable. The cut-off frequency is tuned by means of a control signal at the control input 221, which control input is coupled to the control circuit 21. Signals which are received by the very broad bandwidth antenna 17 can thus be filtered in a suitable manner in the reception path itself upstream of the frequency conversion to an intermediate frequency, and undesirable interference components in the received signal can be suppressed. Furthermore, it is worthwhile providing a low-noise amplifier in the filter device 22, to amplify the signal that has already been filtered. Once again, there is no need for any additional impedance transformation to or from the standardized 50 ohms. The antenna 17, the tuning circuit 18, the matching apparatus 23, the filter 22 and the control unit 21 form a functional unit, which allows signals to be received over a very broad frequency range.

Figure 3:
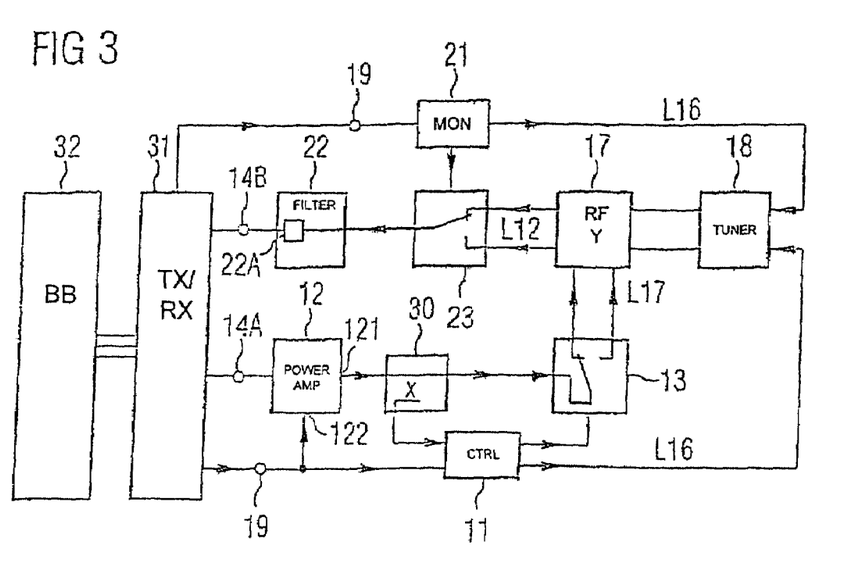
FIG. 3 is a block diagram illustrating a transceiver arrangement having a transmitting arrangement and a receiving arrangement according to another embodiment of the invention.

FIG. 3 shows a detail of a mobile communication appliance in which a transmitting and receiving arrangement according to the invention is implemented. Furthermore, the radio-frequency antenna arrangement 17 and the tuning circuit for frequency tuning 18 are in this case used jointly both by the receiving arrangement and by the transmitting arrangement. In this case, identical components once again have the same reference symbols. The mobile communication appliance has a baseband unit 32, which is designed for digital signal processing. This modulates signals to be transmitted on the basis of the modulation type of a chosen mobile radio standard, and produces a complex-value digital signal. The complex-value signal contains an in-phase component I and a quadrature component Q, and is also referred to as an IQ signal.

The digital IQ signal is supplied to a transceiver device 31, which contains a vector modulator. The digital carrier signal is then mixed in the transmitter device to the output frequency, and is supplied to the power amplifier 12. At the same time, the transceiver 31 passes parameters to the monitoring circuit 11, which uses them as intended presets for output impedance matching of the power amplifier 12 to the antenna arrangement 17. Transferred parameters include, for example, the maximum power to be transmitted, as well as the frequency range of the signals to be transmitted. The monitoring circuit 11 then switches the resonant structures within the matching circuit 13 such that the frequency of the emission or radiation characteristic of the antenna 17 is optimal for the signal to be transmitted. The antenna 17 can thus be tuned to the transmission frequency or to the received frequency by means of the matching apparatus 13.

Furthermore, parameters are supplied to the input 122 of the power amplifier 12. The power amplifier 12 uses these parameters to set the optimum operating conditions. These include the maximum output powers, linearity requirements, etc. Any impedance change or mismatch between the output 121 of the power amplifier 12 and the input of the matching apparatus 13 is determined by a standing wave detector 30. This standing wave detector measures the power emitted from the power amplifier as well as the power reflected as a result of the mismatch of the input of the matching apparatus 13. The reflected power in this case represents a measure of the mismatch. The standing wave detector 30 transmits the mismatch to the control device 11, which then produces a new control signal for the matching apparatus 13. The impedance is varied until the reflected power is minimized.

If external influences vary the resonant frequency and/or the emission or radiation characteristic of the antenna 17, its input impedance also changes. The mismatch and the reflected power thus rise. The dynamic change in the antenna impedance is compensated for again by the matching signal from the control device 11 to the matching apparatus 13. Furthermore, any impedance change at the output 121 of the power amplifier 12 can be identified by the standing wave detector 30. An impedance change such as this may be caused, for example, by changes in the gain parameters at the input 122. The standing wave detector 30 which transmits the reflected power to the control circuit 11 thus allows optimum matching of the input of the antenna to the output 121 of the power amplifier 12.

When switching from the transmission mode to the reception mode, the lines L17 from the radio-frequency antenna 17 and the lines L12 are switched separately, so that the matching apparatus 23 in the reception path is connected to the radio-frequency antenna arrangement 17. The output impedance of the antenna 17 is matched to the input impedance of the filter 22 by means of the matching apparatus 23. The output of the filter 22 is in turn connected to the transceiver circuit 31. The transceiver circuit 31 demodulates the received signal on the basis of the modulation type of a chosen mobile radio standard, and uses this to determine a signal-to-noise ratio. The signal-to-noise ratio represents a measure of any possible mismatch between the output impedance of the antenna arrangement 17 and the input impedance of the filter 22. With optimum matching, the received signal can clearly be distinguished from the background noise. Any mismatch reduces the signal-to-noise ratio. The transceiver circuit 31 transmits various parameters to the control circuit 21, which then controls the matching apparatus 23 until an optimum signal-to-noise ratio is set. In addition, the control circuit 21 is connected to the tuning circuit 18, in order to adjust the resonant frequency of the radio-frequency antenna arrangement 17. In consequence, the antenna is optimally tuned to the signal to be received.

In this exemplary embodiment, apart from the baseband unit 32, the transceiver circuit 31 and the radio-frequency antenna arrangement 17, all of the assemblies are in the form of monolithically integrated circuits in one semiconductor body. There is no need for any additional transformation to or from 50 ohms between the individual assemblies. The matching apparatus 13 and 23, the control circuits 11 and 21 as well as the filter 22 and the power amplifier 12 are designed and developed as one functional unit, in this example. Optimum matching between the assemblies is provided just by virtue of the joint design.

Figure 4:
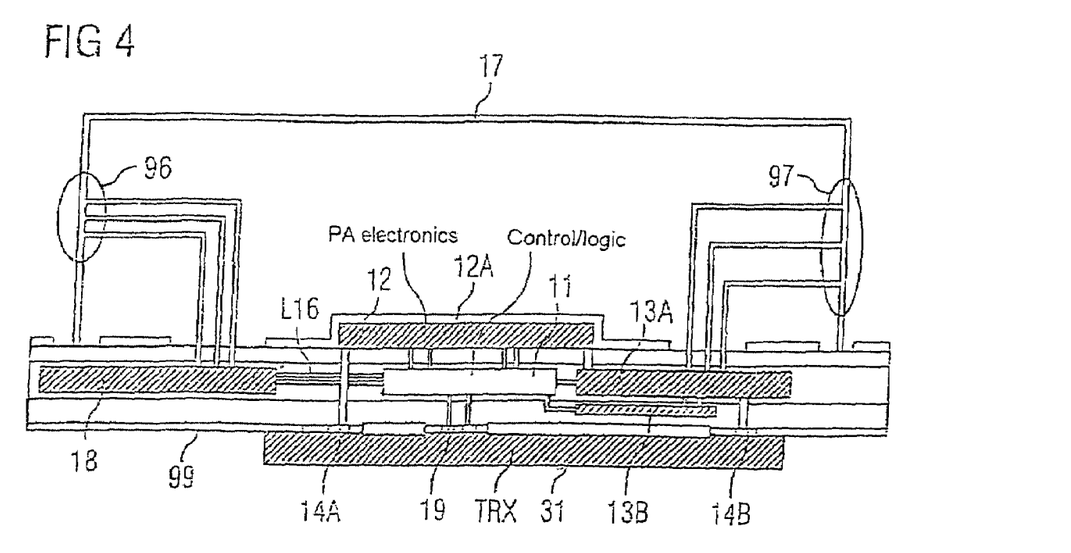
FIG. 4 is a cross section diagram illustrating an embodiment in a semiconductor body.

The functional unit can clearly be seen in FIG. 4, which shows a semiconductor chip 99 with a resonator 17 mounted on it. The resonator 17 forms the radio-frequency antenna arrangement, and is designed using a laminate technique as a structured antenna with a thin metal layer, embedded in an organic plastic. The antenna contains a number of connections 96 in order to vary the resonator frequency. These connections are also referred to as resonator circuitry, and are connected to the tuning circuit 18 in order to tune the resonant frequency of the radio-frequency antenna arrangement 17. The tuning apparatus 18 is provided within the semiconductor body 99. A number of lines L16 lead to a control circuit 11, which is likewise implemented in the semiconductor body. The semiconductor chip contains a power amplifier 12, which is surrounded by a ground shield 12A. This is used to prevent emitted RF radiation being coupled into the power amplifier 12. In addition, the monitoring logic is connected to a control circuit 13B, which is part of the matching circuit. The control circuit 13B in turn controls the individual matching elements 13A of the matching apparatus. The impedance of the radio-frequency antenna arrangement is matched to the output impedance of the power amplifier via a number of switchable elements at the connections 97, which can each be coupled to the radio-frequency antenna arrangement 17. The connections 14A, 19 and 14B are provided on the rear face of the semiconductor body 99 and lead to the transceiver unit 31. The joint implementation in a single semiconductor body means that there is no need for transformations to or from 50 ohms between the assemblies.

Figure 5:
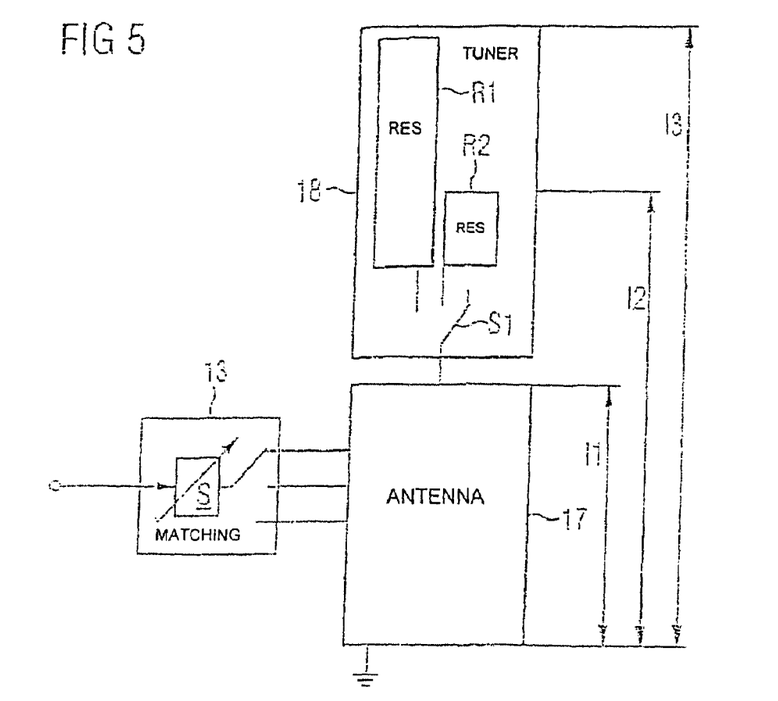
FIG. 5 is a block diagram illustrating a detail of the exemplary embodiment shown in FIG. 1, FIG. 6 and FIG. 7 are a block diagrams illustrating various embodiments of a radio-frequency antenna arrangement with connected assemblies as shown in the exemplary embodiment in FIG. 3.

FIG. 5 shows a detail of a transmitting arrangement with an antenna arrangement, a resonant circuit and a matching apparatus as shown in FIG. 3, and in which the radio-frequency antenna arrangement 17 has a resonator length L1. The tuning apparatus 18 contains a switch S1, which can assume three switchable states. In addition, the tuning circuit 18 contains further resonator elements R1 and R2, so that the resonator length L1 is varied with an appropriate switch position of the switch S1. The resonator lengths L1, L2 and L3 for the antenna arrangement can thus be adjusted overall. This results in three different resonant frequencies. The impedance change which results from this of the entire arrangement on the radio-frequency antenna arrangement 17 and on the tuning circuit 18 which is connected to it is compensated for by a matching apparatus 13. In this exemplary embodiment, three individual matching elements are provided, which each match the output (which is not illustrated) of the power amplifier 12 to the radio-frequency antenna arrangement 17 and to the matching apparatus 18. One of the three matching elements is thus selected as a function of the selected resonator length.

Figure 6:
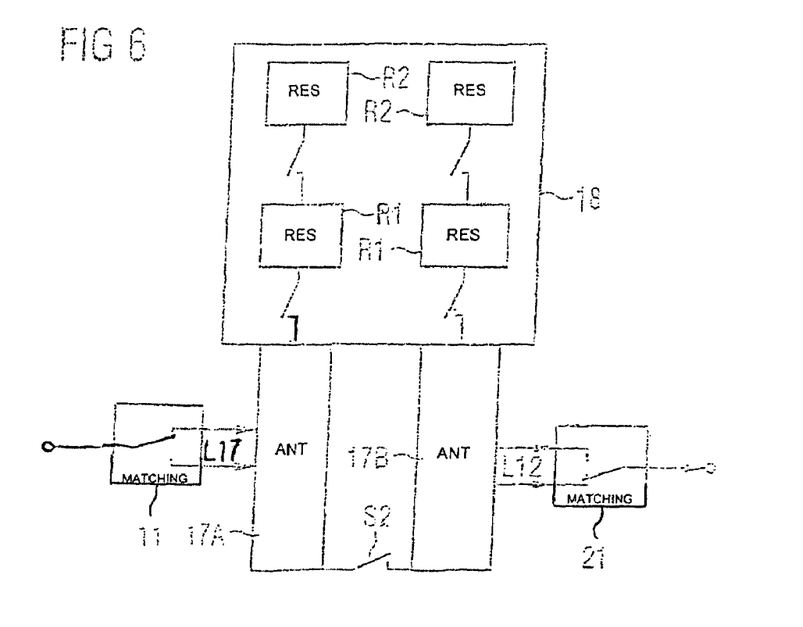

FIG. 6 shows an antenna arrangement which has two antenna elements 17A and 17B. A switch S2 is provided between the two antenna elements. The two antenna elements 17A and 17B can thus be connected (to form an overall antenna) to a resonator length as the sum of two individual resonator lengths. Furthermore, the two antenna elements can be used at the same time by opening the switch S2. In addition, each of the antenna elements 17A and 17B is coupled to the matching apparatus 18 and to resonator elements R1 and R2 which are contained in it. In this exemplary embodiment, the antenna element 17A represents a transmitting antenna, which is connected to the matching network 11. The antenna element 17B is connected to the matching element 21 in the reception path. The matching by the networks 11 and 21 is carried out by means of different matching elements in the networks, which can each be connected in the signal path via switches. Matching is thus possible only in discrete steps. This arrangement makes it possible to achieve the greatest possible flexibility for simultaneous reception and transmission of signals, and for the frequency matching of the antenna arrangement.

Figure 7:
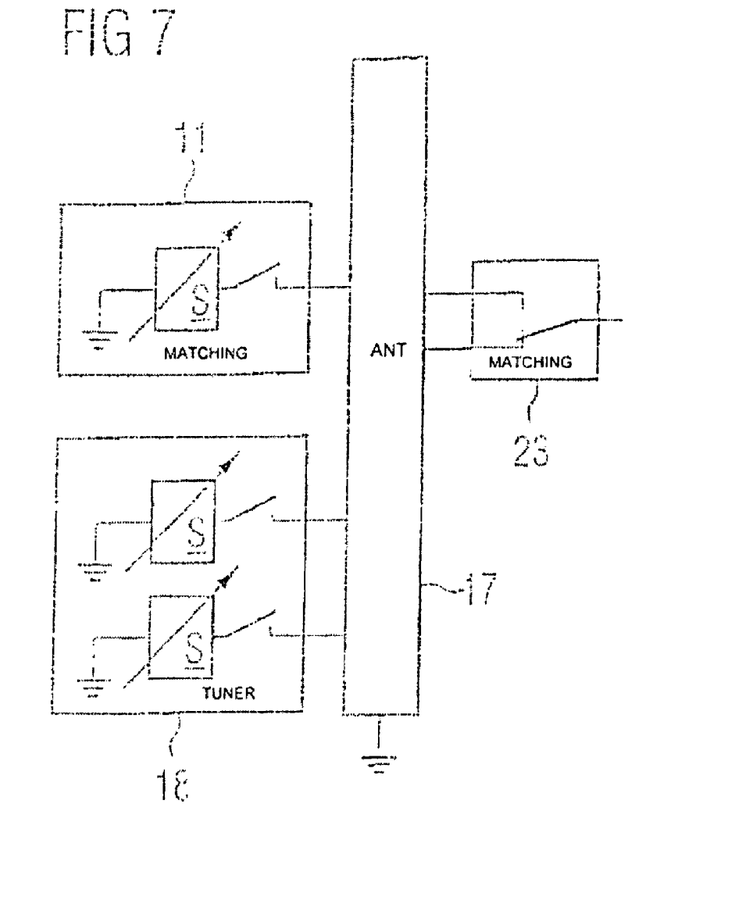

FIG. 7 shows a further circuitry variant, in which the tuning apparatus 18 is designed for continuous tuning of the resonant frequency of the antenna arrangement 17, with continuous tuning. The output impedance of the antenna arrangement 17 is matched to the filter device in the reception path by matching, which can be varied in discrete steps, to the matching apparatus 23. A number of matching elements are once again provided for this purpose, and can be connected to the output and to the antenna 17 by means of a switch. A matching apparatus 13 is provided for the transmission path, and is designed for continuous impedance matching.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

LIST OF REFERENCE SYMBOLS 1, 2, 99: Semiconductor body
11, 21: Control circuit
12: Power amplifier
13, 23: Matching apparatus
17: Antenna apparatus
18: Tuning circuit
22: Filter
30: Standing wave detector
31: Transceiver
32: Baseband unit
19: Control signal inputs 14: Signal inputs
L12, L17: Antenna lines
L16: Control lines
132, 231: Matching input
110, 122: Control input
Z1, Z2: Impedances
R1, R2: Resonators
L1, L2, L3: Resonator lengths
P1, P2: Assemblies
A1, A2, A3, A4: Impedance transformation circuits

The invention claimed is:

1. A receiving arrangement, comprising:
a radio-frequency antenna arrangement configured to receive radio-frequency signals, comprising a tuning connection for tuning a resonant frequency of the radio-frequency antenna arrangement, and comprising at least one connection for emission of a received signal;
a tuning circuit configured to tune a frequency of the radio-frequency antenna arrangement, comprising a control input and at least one tuning element coupled to the tuning connection of the radio-frequency antenna arrangement as a function of a tuning signal;
a filter device configured to suppress signal components in the received signal, comprising an input and an output, wherein the input is coupled to at least one connection of the radio-frequency antenna arrangement;
at least one matching apparatus connected between the input of the filter device and the at least one connection of the radio-frequency antenna arrangement, and configured to control a matching of an output impedance of the radio-frequency antenna arrangement to an input impedance of the filter device; and
a control device comprising a first output for a control signal connected to the control input of the tuning circuit, and comprising a second output and providing a matching signal thereat, wherein the second output is connected to the matching apparatus, and wherein the control device is configured to produce and emit the control signal and the matching signal as a function of at least one predetermined parameter,
wherein the output of the matching apparatus is connected to the input of the filter device without any impedance transformation circuit therebetween.

2. The receiving arrangement of claim 1, further comprising a measurement apparatus configured to measure a signal-to-noise ratio of a received signal at the output of the filter device, and further configured to supply a parameter derived from the measured signal-to-noise ratio to an input of the control device as the at least one predetermined parameter.

3. The receiving arrangement of claim 1, wherein the input impedance of the filter device is substantially equal to the output impedance of the matching apparatus.

4. The receiving arrangement of claim 1, wherein the filter device comprises an amplifier device configured to amplify signals that are applied to the input thereof.

5. The receiving arrangement of claim 1, wherein the filter device comprises a filter having a tunable cut-off frequency.

6. The receiving arrangement of claim 1, wherein at least the matching apparatus and the filter device are in the form of an integrated circuit in a semiconductor body.

7. The receiving arrangement of claim 1, wherein the input impedance of the filter device has a value other than 50 ohms.

8. The receiving arrangement of claim 1, wherein the control device comprises an input for receiving one or more signals that characterize the at least one predetermined parameter.

9. The receiving arrangement of claim 1, wherein the at least one predetermined parameter is derived from a resonant frequency of the radio-frequency antenna arrangement.

10. The receiving arrangement of claim 1, wherein the radio-frequency antenna apparatus comprises a laminate structure, wherein the radio-frequency antenna apparatus resides on a metallic layer to an organic mount.

11. The receiving arrangement of claim 1, and further comprising a transmitting arrangement to collectively form a transceiver, the transmitting arrangement comprising:
a power amplifier comprising an input for a signal to be amplified, and an output coupled to the at least one connection of the radio-frequency antenna arrangement;
a controllable matching apparatus connected between the output of the power amplifier and the at least one connection of the radio-frequency antenna arrangement, and configured to match an input impedance of the radio-frequency antenna arrangement to an output impedance of the power amplifier; and
a control device comprising a first output for supplying a control signal connected to the control input of the tuning circuit for frequency tuning, and comprising a second output for supplying a matching signal connected to the matching apparatus, wherein the control device is configured to produce and emit the control signal and the matching signal as a function of at least one predetermined parameter,
wherein the output of the power amplifier is connected to the input of the matching apparatus without any impedance transformation circuit therebetween,
and wherein the radio-frequency antenna arrangement and the tuning circuit of the transmitting arrangement and of the receiving arrangement are configured to be used jointly by the transmitting arrangement and the receiving arrangement.

12. The transceiver arrangement of claim 11, further comprising a measurement apparatus configured to detect any mismatch between the matching apparatus and the output of the power amplifier, and generate and output a parameter derived from the mismatch at an output thereof, and wherein the output of the measurement apparatus is coupled to an input of the control device in order to supply the at least one predetermined parameter.

13. The transceiver arrangement of claim 12, wherein the measurement apparatus is configured to measure reflected power.

14. The transceiver arrangement of claim 11, wherein the output impedance of the power amplifier is equal to the input impedance of the matching apparatus.

15. The transceiver arrangement of claim 11, wherein at least the matching apparatus and the power amplifier are in the form of an integrated circuit in a semiconductor body.

* * * * *